United States Patent
Arnaiz et al.

(10) Patent No.: US 7,080,371 B1
(45) Date of Patent: Jul. 18, 2006

(54) METHOD, SYSTEM, APPARATUS AND PROGRAM PRODUCT FOR DISTRIBUTION AND INSTANTIATION OF SOFTWARE UPGRADES

(75) Inventors: Gilberto Arnaiz, Redwood City, CA (US); Robert A. Brodersen, Redwood City, CA (US); Prashant Chatterjee, Saratoga, CA (US); Peter Siam Sy Lim, III, Redwood City, CA (US); Duane E. Wandless, Bloomsbury, NJ (US)

(73) Assignee: Siebel Systems, Inc., San Mateo, CA (US)

( * ) Notice: Subject to any disclaimer, the term of this patent is extended or adjusted under 35 U.S.C. 154(b) by 808 days.

(21) Appl. No.: 09/653,706

(22) Filed: Sep. 1, 2000

Related U.S. Application Data (63) Continuation of application No. PCT/US99/04581, filed on Mar. 3, 1999.

(60) Provisional application No. 60/076,667, filed on Mar. 3, 1998.

(51) Int. Cl.
G06F 9/44 (2006.01)

(52) U.S. Cl. .................. 717/170; 717/168; 717/174

(58) Field of Classification Search ........ 717/101–103, 717/120–123, 168–178; 709/230
See application file for complete search history.

(56) References Cited

U.S. PATENT DOCUMENTS

| | | | |
|---|---|---|---|
| 5,155,847 A | 10/1992 | Kirouac et al. | |
| 5,473,772 A | 12/1995 | Halliwell et al. | |
| 5,579,509 A * | 11/1996 | Furtney et al. | 717/170 |
| 5,586,304 A * | 12/1996 | Stupek et al. | 717/170 |
| 5,613,101 A * | 3/1997 | Lillich | 709/230 |
| 5,666,501 A | 9/1997 | Jones et al. | 345/748 |
| 5,684,952 A | 11/1997 | Stein | 709/221 |
| 5,715,462 A | 2/1998 | Iwamoto et al. | 717/173 |
| 5,752,042 A * | 5/1998 | Cole et al. | 717/173 |
| 5,845,077 A * | 12/1998 | Fawcett | 717/173 |
| 5,867,714 A * | 2/1999 | Todd et al. | 717/172 |
| 5,960,204 A * | 9/1999 | Yinger et al. | 717/176 |
| 5,999,740 A * | 12/1999 | Rowley | 717/173 |
| 6,282,709 B1 * | 8/2001 | Reha et al. | 717/175 |
| 6,324,693 B1 * | 11/2001 | Brodersen et al. | 717/177 |
| 6,385,770 B1 * | 5/2002 | Sinander | 717/170 |
| 6,418,555 B1 * | 7/2002 | Mohammed | 717/169 |

FOREIGN PATENT DOCUMENTS

| | | |
|---|---|---|
| EP | 0802480 | 10/1997 |
| EP | 0 811 942 A2 | 12/1997 |

(Continued)

OTHER PUBLICATIONS

Dictionary of Computing; Oxford University Press; 1996; pp. 149.*

(Continued)

*Primary Examiner*—Kakali Chaki
*Assistant Examiner*—William H. Wood
(74) *Attorney, Agent, or Firm*—James W. Soong; Perkins Coie LLP (57) ABSTRACT

Distributing and instantiating software version upgrades in a distributed computing environment. This includes defining the required versions of software as the contents of a software version upgrade kit. This is written, e.g., as a table of contents or a list, to a database to generate software version upgrade kit tables. These tables are used to generate software version upgrade kits. The kits are then used as a source to download copies of the upgrade kits to clients to be upgraded. This enables upgrading the software on the client.

8 Claims, 4 Drawing Sheets

FOREIGN PATENT DOCUMENTS

| WO | WO 98/40805 | * | 9/1998 |
|---|---|---|---|
| WO | WO 99/45465 | | 9/1999 |
| WO | PCT/US99/04581 | | 7/2000 |

OTHER PUBLICATIONS

M2 Communications, Siebel Announces Production Shipment of Siebel Enterprise Applications, Version 3.0, M2 Presswire, Feb. 28, 1997, p. 2.

Arnaiz, G., et al., "Method, System, Apparatus and Program Product for Distribution and Instantiation of Software Upgrades", U.S. Appl. No. 60/076,667, filed Mar. 30, 1998, pp. 1-43, Figures 1-8.

Anonymous, "Logging Status Information While Installing New Software," IBM Technical Disclosure Bulletin, IBM Corp., vol. 34, No. 1, Jun. 1991 p. 177, New York, USA.

* cited by examiner

| Action | Arguments | Description |
| --- | --- | --- |
| FileCopy | File, directory | Copies file into directory |
| FilePatch | File, directory | Like copy, but uses incremental data technology |
| FileDelete | File, directory | Deletes file from directory |
| FileExecute | ExeFile, exeArgs | Invoke a stand-alone executable (may be interactive) |
| DbSql | SqlFile | Run the statements in sqlFile |
| DbDAT | DataFile | Load data from dataFile |
| DbDDL | DDLFile | Issue ddl needed to make local database schema match file |
| Repimexp | RepimexpFile | Load repository data from repimexpfile |

Figure 5

METHOD, SYSTEM, APPARATUS AND PROGRAM PRODUCT FOR DISTRIBUTION AND INSTANTIATION OF SOFTWARE UPGRADES

CROSS-REFERENCE TO RELATED APPLICATIONS

This application is a continuation and claims priority under 35 USC §120 and/or §365 to PCT International Application Ser. No. PCT/US99/04581 filed Mar. 3, 1999, which in turn claims priority to U.S. Provisional Application No. 60/076,667 filed Mar. 3, 1998, each of which is incorporated herein in its entirety by reference.

FIELD OF THE INVENTION

This invention relates to a system, method, and program product for providing software updates online. The updates may be provided to one or more of a sequence of individual computers, or to a network of computers. In a preferred exemplification, the software updates are provided to individual clients in a client server-network, for example a client-server network of the type executing a partially replicated relational database or transaction processing system, an enterprise on a WAN or a LAN.

BACKGROUND OF THE INVENTION

Business enterprises utilize large numbers of terminals, i.e., desktop computers, portable computers, and network terminals to carry out their activities. While it is desirable that all of these terminals have identical images, interfaces, and software, this is not always possible when a continuum of terminal ages and capabilities exists in an enterprise. However, it is absolutely essential that the set of terminals in an enterprise be able to communicate effectively. This requires careful planning for and coordination of software migration efforts.

In a system including one or more central databases (including correspondence databases and such databases as are contemplated in groupware applications such as Lotus Notes, Novell GroupWise, and the like) and locally partially replicated databases, there is considerable amount of software which is often customized to meet the needs of particular enterprise, and even particular users and groups of users within elements of the enterprise. A great deal of effort is expended on configuring the software and writing custom modules and objects. If the software is upgraded to a new release, a considerable amount of programming time and effort are required to provide consistent upgrades while configuring the new release and reimplementing the customer-specific functionality of the earlier versions.

It is therefore desirable to provide a capability to provide a facility which allows enterprises to rapidly migrate their changes from one version of the software to another version of the software, such as configurations and objects.

It would be desirable to accomplish rapid migration of software upgrades in a user-friendly, on-line method through the use of on-line distribution of software upgrades.

OBJECTS OF THE INVENTION

It is an object of the invention to provide on-line distribution of software upgrades while satisfying the following business requirements:

It is a primary object of our invention to provide database schema synchronization.

It is a further object of our invention to provide support for all types of installations and terminals in an enterprise. That is, the sol, are provider or the upgrader, e.g., the database administrators must be able to upgrade all types of the installations in an enterprise, including connected clients, remote clients, regional servers and application servers.

It is a still further object of our invention to provide support for the upgrading of third party software.

It is still a further object of our invention to support both full and partial upgrades installed software in an enterprise.

An additional object is restartability. This means that the upgrade software must track the progress of upgrades and automatically roll back changes when an error occurs, and the upgrade software must also be able to restart the upgrade from the last save point.

An important object of the invention, especially in an enterprise characterized by heterogeneity and/or geographical dispersion is centralized definition and monitoring, upgrader, e.g., the database administrators must be able to easily define and distribute software and schema upgrades from a central location and to monitor the progress of upgrades across all installations.

The upgrade must be able to stand alone. This means that upgrades must be able to run by themselves, and not depend on other programs or data.

Finally, these objects must be attained and maintained while preserving ease of use and user friendliness.

SUMMARY OF THE INVENTION

These and other objects are objected by the method, apparatus, system, and program product of our invention.

Our invention provides software version upgrades and database schema synchronization. The software provider or upgrader, e.g., the database administrator, applies and distributes database schema changes to all remote databases including mobile databases and regional databases. Moreover, the software provider or upgrader, e.g., the database administrator, applies minor schema changes (e.g. database extensions), patches and major schema changes without manual intervention.

According to our invention, it is possible to provide sol, are version upgrade all types of installations. That is, the software provider or the upgrader, e.g., the database administrators is now able to upgrade all types of installations and terminals, including connected clients, remote clients, regional servers, and application servers.

One aspect of our invention is a method of distributing and instantiating software version upgrades in a distributed computing environment. This method includes setting the minimum (and maximum) levels of the version for installed software, and using those levels to define the contents of software version upgrade kits. The contents of the software version upgrade kits are then written to a database, e.g., as a table of contents or the like, and used top generate software version upgrade kit tables. These tables are used to build software version upgrade kits. Copies of the upgrade kits are downloaded to clients to be upgraded; and the software on the client is upgraded.

After the table of contents of the software upgrade kits is installed, it is compared to the locally installed software on a client, with the Software needing to be installed on the client to the client being downloaded to the client. This comparison can be at the startup of the server, the client, or a particular software component.

When the client is a mobile client the comparison and download are carried out at a docking session, with instantiation of the upgrade either during the current docking session or during a subsequent docking session.

In one exemplification of our invention the distributed computing environment is database management system having replicated or partially replicated databases, and the database schema version on the client is compared to the database schema version on server, with reinitialization of the database version on the client if the database schema version on the client and the server do not match, and synchronization of the database the client with the database on the server if the database schema versions on the client and server match.

According to our invention there is support for third party software. The software provider or upgrader, e.g., the database administrators is able to upgrade third party software that customer installation depend on. For example, the software provider, management information services supervisor, or upgrader, e.g. the database administrator, is able to upgrade Microsoft Word, Adobe Acrobat, Microsoft Access and the like residing on customer installations.

Full and partial upgrades are enabled according to the method and apparatus of our invention. Upgrader, e.g., the database administrator, s may upgrade all or part of an installation. For example, the upgrader, e.g., the database administrator, is able to distribute both a completely new installation and a patch for an existing installation such as a CDF file, an executable, a DLL, a report, and the like. In a like manner, upgrader, e.g., the database administrators is able to distribute upgrader for different languages.

These objects are attained while maintaining ease of use and user friendliness. In this regard, ease of use requires automatic detection of existing program and automatic invocation of upgrade programs, including clients and replication agents. The installation software must automatically detect when an upgrade is available and can be applied to the local installation, such that the user does not need to explicitly find and choose upgrades. User-friendliness requires that software upgrade programs must let the user cancel or defer upgrades. The software upgrade programs must keep the user informed on the status of upgrades, inform the user of pending upgrades, the user steps to be performed in an upgrade, time estimates for the upgrade, and progress indicators during the upgrades. This includes self upgrading, upgrades must be able to upgrade themselves, and upgrader, e.g., the database administrator, s must be able to distribute upgrades for the upgrade programs. User-friendliness also includes a requirement adaptivity. That is, the ability for individual users to use any method to install or update software components, whether using an upgrade wizard or not, upgrades should use current state of the software components to identify whether an upgrade is needed.

A related requirement is restartability. That means that the upgrade software must track the progress of upgrades and automatically roll back changes when an error occurs, and the upgrade software must also be able to restart the upgrade from the last save point.

A desirable property is the availability of early downloads. By this expedient, mobile users can download and apply upgrade kits to their local machines even before the upgrade is required. This lets mobile users download the upgrade when they have more time or have access to a fast network (e.g. visiting HQ).

A further desirable property is centralized definition and monitoring, upgrader, e.g., the database administrators must be able to easily define and distribute software and schema upgrades from a central location. Moreover, upgrader, e.g., the database administrator, s must be able to monitor the progress of upgrades across all installations. For example, the upgrader, e.g., the database administrator, must be able to find all installations that have applied an upgrade. This includes guaranteed delivery. All upgrades are distributed and applied to all installations. The upgrader, e.g., the database administrator, must not have to explicitly monitor the status of upgrades on every installation.

Our invention provides be support for Text and Production environments, upgrader, e.g., the database administrator, s must be able to configure and test upgrades in a test environment, and thereafter, easily migrate the changes to a production environment for distribution to all production users.

The upgrades applied by our invention are able to stand alone. This means that upgrade are able to run by themselves, and do not depend on other programs or data.

Installation of upgrades according to our invention requires minimal network traffic. It is important to minimize file transfers by sending upgrades to only the sites that need them. For example, application server upgrades are only sent to regional data installations. Microsoft Word upgrades are only sent to client installations.

THE FIGURES

Our invention may be understood by reference to the FIGURES and TABLES appended hereto.

FIG. 1 illustrates the process of defining software upgrades. As shown in the FIGURE, the administrator defines the upgrade kits, thereby generating upgrade kit files. Next, the client writes the upgrade kit definition to the server database resident in the database server, generating further upgrade kit files. The client also copies upgrade kit files to the file server. When the upgrade kit files are to be released, upgrade kit archive files are created.

FIG. 2 illustrates initiation and distribution of upgrades. In the process shown in FIG. 2 the administrator updates the required versions for a software item. This causes the database server, when started up, this causes the client to compare the required versions of the software with the locally installed versions for each software item. If an upgrade is required the client retrieves the upgrade kit archive file from the file server and invokes the upgrade wizard to apply the upgrade locally. Also, shown in FIG. 2 is upgrading of mobile users. In the case of mobile users an application server routes new required versions to mobile and regional users. After a docking session, the docking client compares the required versions to locally installed versions of the software. If an upgrade is required, the docking client retrieves the upgrade kit archive file from the file server and invokes the upgrade wizard to apply the upgrade the local machine.

DETAILED DESCRIPTION OF THE INVENTION

Implementation Overview

The definition of upgrades, the initiation and distribution of upgrades, and end-user level upgrading are illustrated in the FIGURES.

Figure 1:
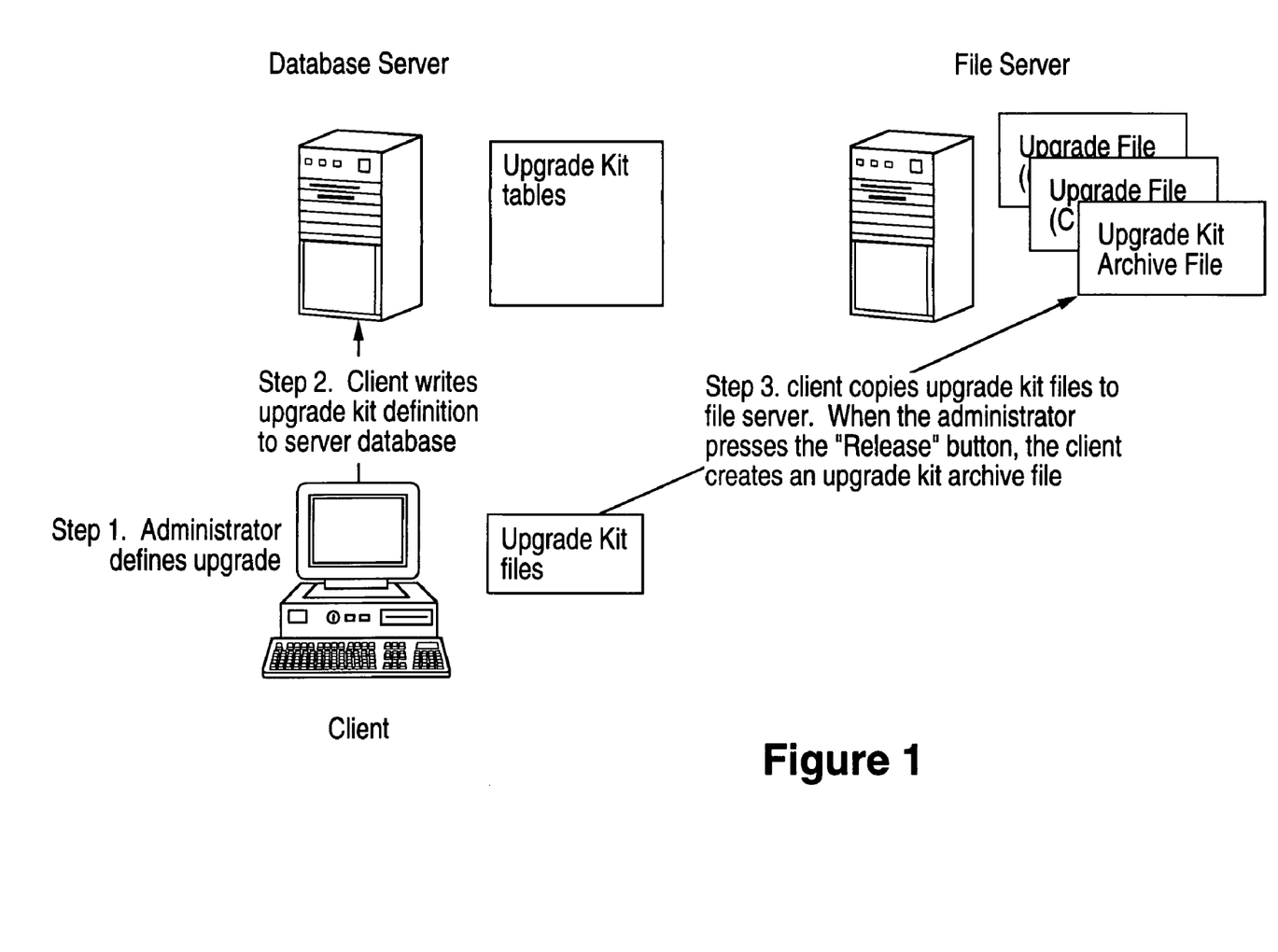

As shown in FIG. 1, the administrator, shown as the client (101) defines the upgrade kits. The client (101) writes this upgrade kit definition to a server database (103) resident in the database server, generating upgrade kit tables (104) in the server database (103). The step of defining the upgrade at the client (101) also generates upgrade kit files (102. The client copies these upgrade kit files (102) to the file server (105), for example, for subsequent downloading. When the upgrade kit files (106) are to be released, upgrade kit archive files are created.

Figure 2:
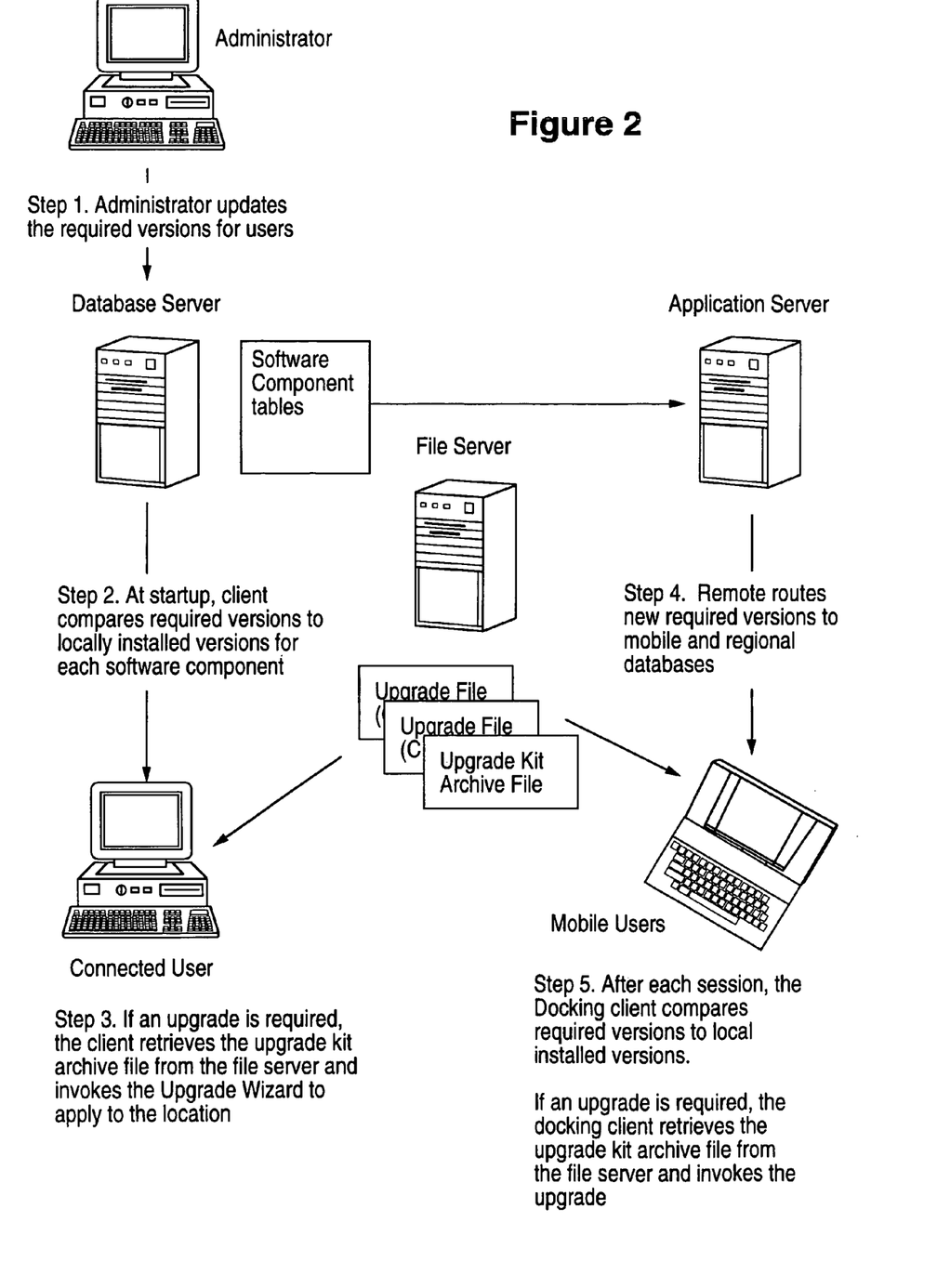

FIG. 2 illustrates initiation and distribution of upgrades. In the process shown FIG. 2 the administrator (101) updates the required versions for a software item.

This causes the database server (103), with resident software component tables (104A), when started up, to compare the required versions of the software with the locally installed versions for each for each connected local user (211) for each software item. If an upgrade is required the local user (211) retrieves the upgrade kit archive file (106) from the file server (105) and invokes an upgrade wizard to apply the upgrade locally.

Also shown in FIG. 2 is upgrading of mobile users (215). In the case of mobile users (215) an application server (213) routes new required versions to mobile (215) and regional users. After a docking session, the docking client compares the required versions to locally installed versions of the software. If an upgrade is required, the docking client retrieves the upgrade kit archive file (106) from the file server (105) and invokes the upgrade wizard to apply the upgrade to the local machine (215).

Figure 3:
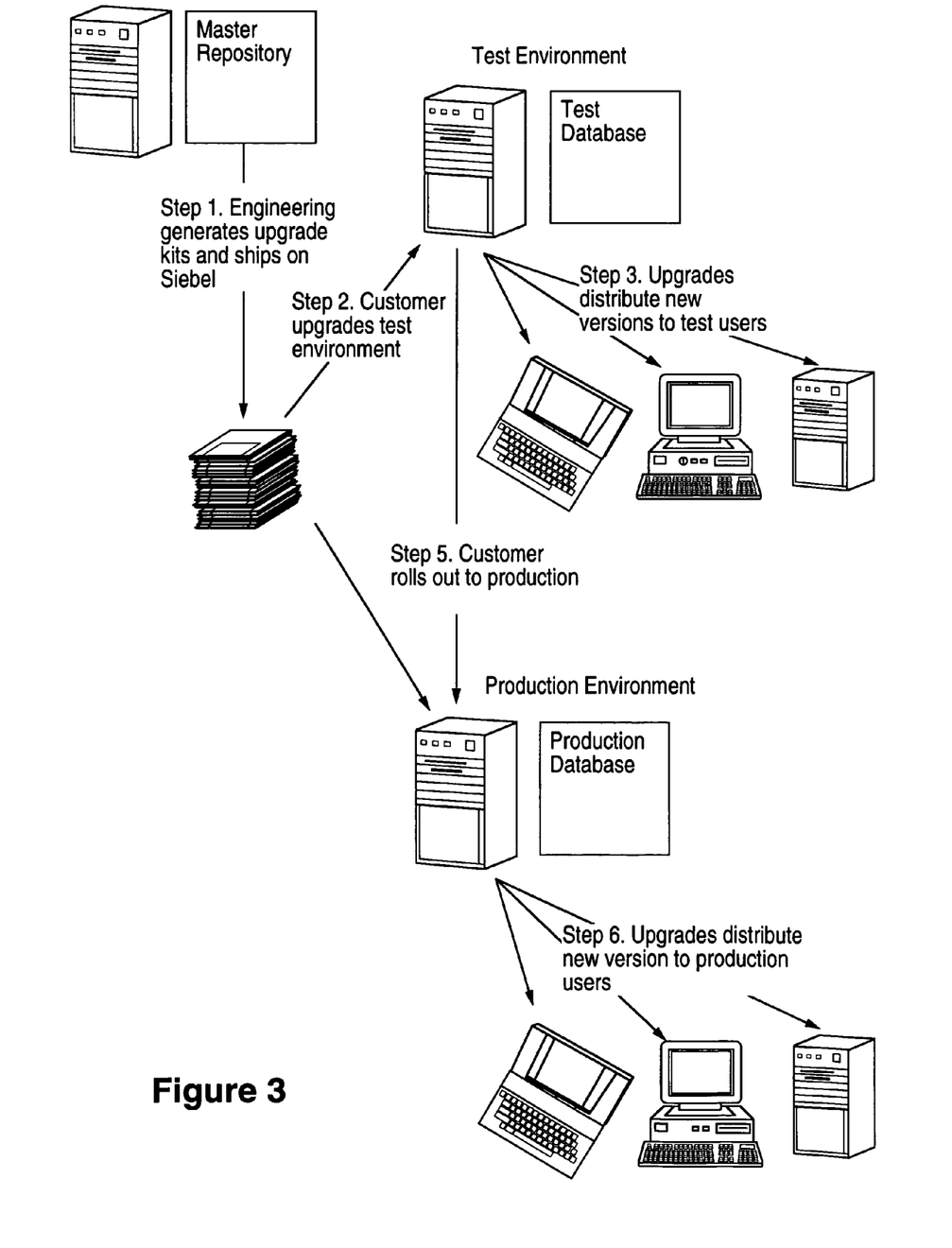
FIG. 3 illustrates the upgrade procedures for customers. As shown in FIGURE upgrade distribution CD's or diskettes are created and shipped to customers. The customer upgrades a test environment, distributes new version of the software testing, and tests the software. If the test is satisfactory, the customer upgrades the new version to production users.

FIG. 3 illustrates one set of test and distribution procedures for customers. As shown in FIG. 3, upgrade CD's or diskettes (307) are created in a master repository (305) and shipped to a test database server (303) for distribution to test users, including server test users (313), connected test users (311), and mobile test users (315). The test users (311, 313, and 315) upgrade their test environments, and the upgraded version of the software for testing. The customers (311, 313, 315) test the software. If the test is satisfactory, the newly upgraded version of the software is distributed to production users (4121, 413, 415).

Figure 4:
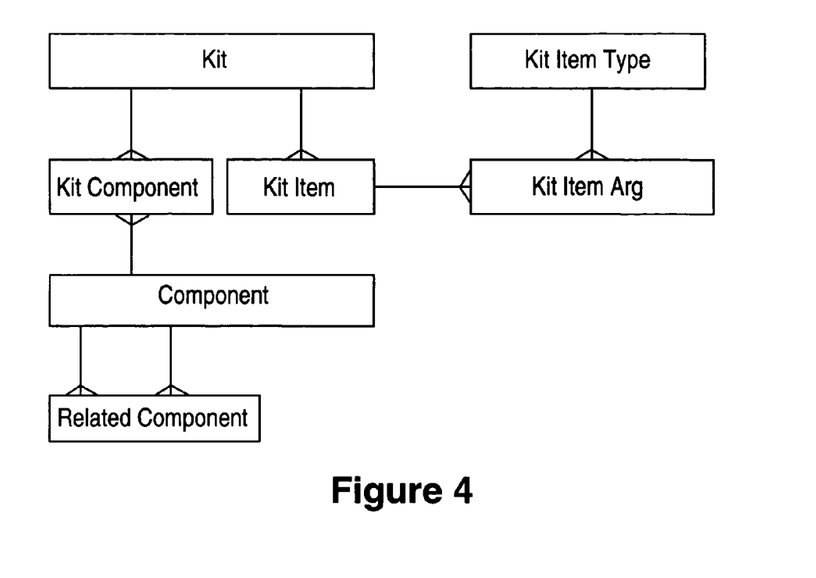
FIG. 4 is a data model for a remote upgrade. It shows the upgrade kit, a kit component, including a component, and a related component, a kit item and kit item argument, and a kit item type argument.
Figure 5:
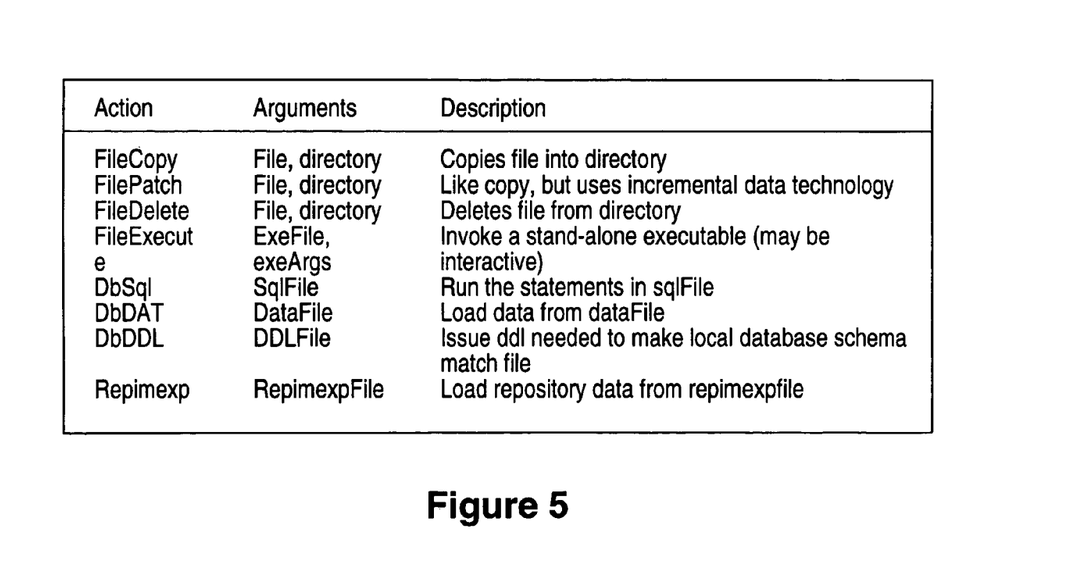
FIG. 5 Table I shows an enumeration of the valid actions for the upgrade kit items, such as copying files into directories, deleting files from directories, invoking stand-alone executables, running statements in SQL files, loading data, issuing ddl, and loading repository files.

FIG. 4 illustrates a data model for a remote upgrade. It shows the upgrade kit (1001), a kit component (1003), including a component (1005), and a related component (1007), a kit item (1009) and kit item argument (1011), and a kit item type (1013).

Software Components

The basic unit of upgrades is the software component. A software component is a set software that can be separately installed and tracked by upgrades. Each software component has a range of required versions. The software vendor, the MIS supervisor, or the upgrader, e.g., the database administrator, specifies the range of required for each software component. Examples of software components in, by way of exemplification only and not limitation, the Siebel Remote application are the Siebel Schema, the Siebel Client, the Siebel Server and Microsoft Word.

Upgrade Kits

The software vendor, MIS supervisor, or upgrader, e.g., the database administrator, creates upgrade kits to install or upgrade one or more software components. An upgrade kit is a collection of files and actions to upgrade one or more software components from one version to another (usually higher) version. To initiate an upgrade of a software component, the upgrader, for example, the upgrader, e.g., the database administrator, builds and releases an upgrade kit to install the new version of the software component. Then the upgrader, e.g., the database administrator, updates the software component's required versions to ensure that users upgrade to the new required version of the software component.

Automatic Upgrade Detection

At certain pre-defined times (e.g. client startup, before and after each synchronization session, before invoking a third party software component, when the Server starts up), system programs verify that software components for the currently running program are up-to-date. For example, in the case of Siebel Remote, the Siebel Client checks the versions of the Siebel Schema and Siebel Client components, but does not necessarily check the Siebel Server component. The server determines the currently installed version of a software component by interrogating the software component itself and comparing the installed versions against the required versions.

If any software component is not within the range of required versions, the server checks the versions of all software components and searches for one or more upgrade kits upgrade the out-of-date software components to the required versions. The server then informs the user of the required upgrades and prompts the user to perform the upgrade.

Upgrade Wizard

The server invokes an upgrade wizard to apply an upgrade kit. After invoking the upgrade wizard, the program exits so as to release any locks on database tables or files that need to be upgraded. For example, the client invokes the upgrade wizard and exits. The Server sends a shutdown messages to all currently active server components, waits for all server components to stop, invokes the upgrade wizard and exits.

The upgrade wizard is preferably a standalone single executable (no DLLs required) that can read and apply an upgrade kit to the local machine. The upgrade wizard keeps track of the upgrade's progress and automatically recovers from errors. For example, it creates a back up of the local database and local files while applying an upgrade kit. If an error occurs anytime during the upgrade, the upgrade wizard attempts to rollback all the changes and restores the local machine to the original state.

When the Client or Server starts, it detects whether an upgrade is in progress or has failed. If so, it informs the user and invokes the upgrade wizard to restart the upgrade. For the Client, if the user declines to restart the upgrade, the Client continues in read-only mode. In read-only mode, the client lets the user view data but prevents the user from modifying data. For the Server, if the upgrader, e.g., the database administrator, declines to restart the upgrade, the Server issues an error message and stops.

After successfully completing an upgrade, the software components on the local machine should be up-to-date. The upgrade wizard restarts the original program that invoked the upgrade.

Using Upgrades

This section describes the process for defining, distributing and applying an upgrade more detail.

Customize

The upgrader, e.g., the database administrator, uses tool programs and other programs to customize the database management system for their environment. The upgrader, e.g., the database administrator, has the capability to extend the database schema and customize client screens, report files and other files.

Define Upgrades

The Upgrader, e.g., the database administrator, defines the upgrade in the server database. This process consists of defining the software components and the upgrade kits needed to upgrade each software component to a specific version.

Define Software Components

The upgrader, e.g., the database administrator, uses a Software Component screen or tool to define new software components. A software component is a set of software that can be separately installed, tracked and de-installed by upgrades. As used herein, a software component has the following attributes:

Name. A name to identify the software component.

Required Versions. A range of versions, that is, the minimum and maximum versions, that must be installed on each machine.

Locate Method. A specification of how to detect whether the software component is installed on a machine. For example, read the windows registry to identify where Microsoft Windows is installed on the local machine.

Version Method. A specification of how to identify the current version of installed software component on a machine. For example, read the Windows registry to get the currently installed version of Microsoft Word on the local machine.

"Compiled" component information. Information about the previously released version of the software component. For example Siebel Remote stores exactly two versions of software components. The user can view and manipulate the current version. Siebel Remote stores the previously released version in a LONG column in the software component table (i.e. S_UPG_COMP). The upgrader, e.g., the database administrator, uses the Component screen to copy the current version into the "compiled" LONG column.

Schema. The schema is the database schema, also referred to as a meta-database. This includes the database tables, indexes, views, seed data and repository data that must be installed in the database to run.

Client. The executables, dlls, reports, help files needed to run the client.

CDF. The definition of a customer's configuration for the client.

Server. The executables, dlls and other files needed to run the server.

Upgrade wizard. The standalone executable that applies upgrade kits on machine.

For most end users, the predefined set of software components described above complete. If needed, the upgrader, e.g., the database administrator, can also define one software components that they want to distribute and apply to their users.

Define Upgrade Kits Using the Upgrade Kit Screen

In a preferred embodiment of our invention, the upgrader, e.g., the data administrator, uses an Upgrade Kit screen to define an upgrade kit to install one or more software components.

Each upgrade kit must contain all the files and commands needed to install the software components. For example, an upgrade kit can be used to install Microsoft Word 7.0.2 on all clients. This upgrade kit must contain all the files (e.g. executables, sample files, templates, etc.) and commands (e.g. update the registry, build short cuts, etc.) to install Microsoft Word 7.0.2. The upgrader, e.g., the database administrator, provides the following information when defining an upgrade kit:

Upgrade kit information. Provide a name, a title and description of the upgrade kit.

Upgrade kit items: The upgrader, e.g., the database administrator, defines a set of actions (or "items") that the upgrade wizard runs in sequence to apply the upgrade kit. Error! Reference source not found, shows a list of possible upgrade kit items. The upgrader, e.g., the database administrator, pre-creates the files for the upgrade kit and registers them with the upgrade kit.

Required component versions. The upgrader, e.g., the database administrator, also defines the list of required software components that must be installed to apply the upgrade kit. For example, an upgrade kit to import data into the database might require that SQL Anywhere v5.5 be installed.

Component versions to install. The upgrader, e.g., the database administrator, also defines the list of software components that the upgrade kit applies example, an upgrade kit to execute a file might install Microsoft Word 7.0.2.

The Upgrade Kit screen provides a wizard to help creating upgrade kits at customer sites. The Upgrade Kit Wizard lets upgrader, e.g., the database administrator, create upgrade kits for software components that users can customize.

After the upgrader, e.g., the database administrator, finishes defining an upgrade, he or she saves the result, for example, by issuing a command, for example, pressing the "Release" button on the Siebel Upgrade Kit screen, to make the upgrade kit available to all installations. The command, for example, the button, does the following:

Generates an upgrade wizard driver file for the upgrade kit.

Creates an upgrade kit archive file and stores it in the file system. The archive file consists of the upgrade wizard driver file and all the files needed to apply the upgrade kit to a machine.

Compiles the upgrade kit information into a "compiled" LONG column. This "compiled" column stores all the information needed by programs to find the upgrade kits. This "compiled" column is provided to reduce the time to find upgrade kits.

Deploy Upgrades

After defining the upgrade, the upgrader, e.g., the database administrator, then initiates the upgrade from the server database. Client programs at all locations automatically detect and apply the upgrades as needed.

Early Download of Upgrade Kits

After the upgrade kit is defined, it is possible to distribute the upgrade kit definitions associated files to mobile and regional databases. In this case mobile users can navigate to the Upgrade Kit screen and request that the database management system download the upgrade kit archive file in the next synchronization session. This lets mobile users download large upgrade kit archive files long before the upgrade kit needs to be applied to the local machine. For example, the mobile user may be visiting headquarters and can download the upgrade kit archive file in much less time over the LAN than over a modem.

Early download of upgrade kits is not mandatory for mobile users. The mobile user does not need to explicitly request the upgrade kit archive file: The database management software can automatically download the upgrade kit archive file if it needs to apply the upgrade kit and the upgrade kit archive file is not accessible on the local machine.

Initiate Upgrades

After defining software components and upgrade kits, the upgrader, e.g., the database administrator, can initiate an upgrade of the software component. The upgrader, e.g., the database administrator, must first set the required versions of the software component. There are two ways of setting the required versions: The first way is through the component screen. The upgrader, e.g., the database administrator, uses the component screen to manually update the required versions for a software component. He or she uses the screen to modify the minimum or maximum required version of one or more software components.

Alternatively, the upgrader, e.g., the database administrator, can utilize an Upgrade Kit screen. The upgrader, e.g., the database administrator, uses the Upgrade Kit screen update the required versions of a software component. The upgrader, e.g., the database administrator, selects an upgrade kit, and, initiates a function to set the required versions for example, in the case of Siebel Remote, the upgrader presses the "Set Required Versions" button. The button finds all the software components that the upgrade affects and sets their maximum versions. The maximum versions are set to the versions that the upgrade kit installs.

The upgrader, e.g., the database administrator, uses a component or similar screen to "release" the new software component information to all users. The upgrader, e.g., the database administrator, selects a software component and presses the "Release" button. The button reads all the information about the selected software component and related software components, verifies the information, writes the information to the "compiled" LONG column and logs a transaction to replicate the information to all databases.

Detect and Apply Upgrade Kits

Upgrade programs of our invention automatically detect an upgrade by comparing the currently installed version of each component to the required versions. The client reads the required versions from the software component "compiled" LONG column at start up. Servers also read the required versions from the software component "compiled" LONG column at start up.

For mobile users and regional databases, the upgrader, e.g., the database administrator, distributes the updated required versions to all remote databases. The docking client and Replication Agent query the docking server for the required schema versions before each synchronization session. If a change to the software component compiled column occurs during a synchronization session, the docking client and Replication Agent reads the required versions after the synchronization session.

If any of the versions do not match, then an upgrade is required and the program searches for one or more upgrade kits to apply, applies the upgrade kits in two steps:

Download the upgrade kit archive file to the local machine

Invoke the upgrade wizard to apply the upgrade kit to the local machine

For mobile and regional database installations, the docking client downloads the upgrade kit archive file from the server, typically the database server, to the local inbox directory. For connected users, the client downloads the upgrade kit archive file in the file system to the temp directory on the local disk.

After the upgrade kit is accessible on the local machine, the upgrade wizard applies the upgrade. The upgrade wizard extracts files from the upgrade kit archive file, then performs each of the upgrade kit actions in sequence. If an error occurs, the upgrade wizard rolls back the upgrade kit actions and displays an error to the user. The program detects and invokes upgrades again the next time.

After successfully completing all the upgrade kit actions, the upgrade wizard deletes the upgrade kit files from the local machine and restarts the program that invoked the upgrade.

Integration

The upgrade installation system uses a package, for example, Siebel Upgrades, to initialize and maintain remote databases. The upgrade wizard initializes new remote databases, performs database re-extracts, and handles database schema upgrades.

Extract Remote Databases—When extracting a remote database, Database Extract creates an upgrade kit archive file in the outbox directory. This database extract archive file consists of an upgrade wizard driver file and several items to initialize the local database:

Create database. Copy the database template file (for mobile users)

Snapshot data. Import a database snapshot file containing visible data for the mobile user Sql files. Execute a set of SQL files that create users and initialize data in the database.

Database Initialization

The client, Replication Agent, docking client and standalone Dbinit (database initialization) program invoke Dbinit to initialize a local database. Database initialization (Dbinit) ensures that all required versions exist on the local machine and creates a local database for the mobile client.

Dbinit performs these steps:

Connect to Server. Dbinit prompts the user for the name of the local mobile client, the password for the mobile client and the address of the Remote Server (the mobile user should get this information from his or her upgrader, e.g., the MIS staff, the vendor, or the database administrator). Database initialization connects to the Remote server and validates the mobile client name, user and password.

Perform version check and download upgrade kits. Dbinit then performs a version check to ensure that all required software components exist on the local machine. Dbinit first downloads the required versions (i.e. the compiled information) from the docking server. Dbinit compares the required versions against the versions on the local machine. If one or more versions do not match, then Dbinit downloads information about all (all? Not some?) upgrade kits. Dbinit then searches for upgrade kits to apply and downloads the upgrades kits to the local inbox directory.

Download extract snapshot file. Dbinit downloads the database extract snapshot file to the local inbox directory.

Create driver file. Dbinit creates an upgrade wizard driver file to apply the upgrade kits to the local machine and create the local database using the database extract snapshot file.

Run upgrade wizard. Dbinit invokes the upgrade wizard to apply the upgrade kits and initialize the local database.

If the initialization is successful, the upgrade wizard then restarts the calling program.

Automatic Initialization from the Client

When a mobile user runs the client against the local database, the client checks whether the local database file exists. If the local database does not exist, the client prompts the user whether he wants to initialize a local database. If so, the Client invokes Dbinit to create the local database and also ensure that all software components are up-to-date.

Version Checking

At the beginning of each synchronization session, the docking client checks whether a database extract or a database schema upgrade is pending. This is because the docking client must perform a schema version check at the start of the docking session because the docking client must know whether it can upload transactions to the server database or must discard the transactions. The docking client also must know whether it must perform a dbinit to re-initialize the local database.

After the docking client connects to the docking server, the docking client asks docking server for the server database schema versions. There are three possible outcomes:

Major Schema Change. If the major and minor schema versions of the local database and the server database do not match, then a database re-initialization is "required". A change in the major or minor schema versions implies that the server database has undergone a major schema change. The docking client discards all pending transactions to upload. The docking client informs the mobile user and invokes the upgrade wizard to initialize the local database and upgrade sol, ware components (if any). If a database extract is not available, then the docking client displays an error asking the mobile user to contact the upgrader, e.g., the database administrator, to re-extract the docking client. Pending Dbinit, if there is no major schema change and the upgrader, e.g., the database administrator, has re-extracted the docking client, then the docking client must re-initialize the local database. The docking client saves all pending transactions to upload in a file in the inbox directory called dbinit.dx. The docking client invokes the upgrade wizard to create the new local database and upgrade any new software components. After initializing the local database, the upgrade wizard invokes the data merge utility (dmutl.exe) to apply the saved pending transactions in dbinit.dx to the local database. Dmutl.exe applies the transactions to the local database and logs new transactions to upload to the server database, as if the mobile user has re-entered all the transactions.

Minor Schema Change. If there is no major schema change and no pending dbinit, then the docking client proceeds to synchronize the docking client. Eventually, the docking client applies a transaction to upgrade the required versions of the Schema sol, are component. This update triggers the docking client to perform a version check and eventually causes the upgrade wizard apply an upgrade kit to upgrade the local database.

Initialize a Regional Database

The upgrader, e.g., the database administrator, on the regional database runs standalone database initialization program to initialize a regional database. The program connects to the Remote server and downloads the database extract archive file from outbox directory. The program then invokes the upgrade wizard to initialize the regional database.

Replace a Regional Database

If the upgrader, e.g., the database administrator, on the HQ server runs database extract for an existing regional database, the upgrader, e.g., the database administrator, on the regional database needs to re-initialize the regional database. At the beginning of the each synchronization session, a Replication Agent checks whether a database extract archive file is pending for the regional database. If so, the Replication Agent notifies the upgrader, e.g., the database administrator, and shuts down. The upgrader, e.g., the database administrator, must manually invoke the standalone database initialization program to initialize a regional database.

The Schema upgrade kit consists of one or more of the following items:

DDL file to make schema changes

DAT files to install seed data

Repimexp files to install Repository

SQL scripts to perform special upgrade steps, convert data, and the like

SQL script to update version numbers in the S_APP_VER table

Files to update software components. This includes adding, deleting and updating software component information. At the minimum, the file must update required versions of the components (e.g. you must use the new version of Tools against the new schema).

Files to install upgrade kits that defines. For example, upgrade kits to install a new version of Tools, Server and the like.

Installing the Schema at Customer Sites

The upgrader, e.g., the database administrator, receives the CD, or other media, and applies the upgrade kit to the test/configuration database. Before applying the upgrade kit, the upgrader, e.g., the database administrator, first shuts down all programs: both connected users and Server instances. Then he or she runs the upgrade wizard to apply the upgrade kit to the test database.

The upgrade kit performs the following steps:

Makes schema changes

Imports seed data

Runs repimexp.exe to import the new Repository

Runs SQL scripts to perform special upgrade steps, convert data, and the like.

Updates the version numbers.

Runs files to update the software component tables.

Runs files to install—defined upgrade kits.

Accessing the Database after an Upgrade

At this point, the test/configuration database has the new schema and the software component required versions are set to the new versions. Any program that connects to the server database needs to apply one or more upgrade kits to get to the new required versions. For example, when the upgrader, e.g., the database administrator, logs in to the server database, the software used to login should detect a version mismatch and attempt to upgrade or call the upgrade. The upgrader, e.g., the database administrator, has two options to upgrade to the new Tools version: If an upgrade kit is available, download the upgrade kit and apply it to the local machine.

Install the new version from the CD-ROM. Then, use the version against the server database, upgrader, e.g., the database administrator, must use this option if this is the first time they installed software on the local machine.

If the upgrader, e.g., the database administrator, wants to let programs perform upgrades, he or she can register upgrade kits to upgrade the various software components. Otherwise, he or she can manually upgrade each machine by installing from the CD-ROM.

Customizing and Testing

Upgrader, e.g., the database administrator, can customize local installations in these three ways:

Database extensions such as new extension tables, extension columns or indexes. Configuration changes such as new CDF files, CFG files or report files.

Third party software changes such as new versions of Microsoft Word, Adobe Acrobat and the like.

Customers follow a well-defined procedure for creating and distributing these kinds of customizations. All of these customizations do not cause a major schema change; hence, they do not require a database re-extract.

Step 1: Make the configuration changes on the server database The upgrader, e.g., the database administrator, uses programs to customize end-user installations for their site, and merge the customer's repository with a new repository.

To effect configuration changes during the version or schema upgrade, new .CDF files need to be generated. This is done using an editor to customize CFG files. And a DBMS program such as Microsoft Access to customize reports. Microsoft Help Editor or the like may be used to customize the Help files.

Programs in the upgrade kit compare versions and automatically detect the need to apply an upgrade the next time they start up. The method, apparatus, system, and program product of our invention upgrades connected users. In a similar way, the server upgrades application servers, or, when present, a docking client upgrades local databases. A Replication agent upgrades regional databases.

The method, apparatus, system, and program product of our invention downloads the required upgrade kits and applies the upgrade to the local machine. If the database upgrade changed the major or minor schema versions, the upgrade method, system, apparatus, and program product of our invention automatically re-initializes the mobile or regional database.

A further aspect of our invention is the automatic setting of the required versions software components. Alternatively, the upgrader, e.g., the database administrator can update the required versions and initiate upgrades of one or more software components. In a networked environment the upgrader, e.g., the database administrator, should be very careful when making changes to listing of required versions because updates to this file can cause programs at all locations to invoke upgrades.

In most cases, the application server is self-upgrading. That is, the upgrader, e.g., the database administrator, does not need to intervene to detect and apply an upgrade. However, there are exceptions. If the upgrade kit requires user intervention, then the upgrade software should wait until the upgrader, e.g., the database administrator, provides input.

Similarly, if a database extract is pending, for example, for a regional database, the server must shutdown all access to the regional database, ensure that the transaction merger has successfully merged all pending .dx files from mobile clients, and initiate a database initialization process to re-initialize the regional database.

The software upgrade programs of the invention automatically detect and apply upgrades as needed to maintain the correct software component versions on all machines. Users do not need to manually search for and apply upgrades. This is especially true of users connected on a LAN or WAN, who experience painless upgrades. The client automatically detects and applies upgrades as needed. If an upgrade is detected, the client notifies the user of the software components to upgrade, encourages the user to apply the upgrade and prompts the user to start the upgrade. The system automatically downloads the appropriate upgrade kits to the local disk if the upgrade kit does not already exist on the local disk.

After the upgrade kit is available on the local machine, the client invokes the upgrade wizard to apply the upgrade. The upgrade wizard displays the upgrade kit items prompts the user to start the upgrade. The upgrade wizard starts processing the upgrade kit items and regularly informs the user of the progress. When the upgrade wizard complete, it restarts the original program.

Mobile users also experience painless upgrades. Mobile users do not need to explicitly invoke database initialization. Attempting to start the Client against the local database with no local database available automatically invokes database initialization to create the local database. Dbinit also ensures that all software components are up-to-date on the local machine.

Mobile users can download upgrade kits earlier than necessary by navigating to the Upgrade Kit screen and requesting to download the upgrade kit archive file in the next synchronization session.

The upgrade software of our invention performs a version check at the start of each synchronization session. If an upgrade is detected, the client notifies the user of the software components to upgrade, encourages the user to apply the upgrade and prompts the user to start the upgrade, automatically downloads the appropriate upgrade kits to the local disk if the upgrade kit does not already exist on the local disk.

After the upgrade kit is available on the local machine, the client invokes the upgrade wizard to apply the upgrade. The upgrade wizard displays the upgrade kit items and prompts the user to start the upgrade. The upgrade wizard starts processing the upgrade kit items and regularly informs the user of the progress. When the upgrade wizard is complete, it restarts the original program.

If a re-initialization is required, the docking client invokes Dbinit to reinitialize the local database.

In one exemplification of our invention a component screen lets the upgrader, e.g., database administrators define software components and specify the required versions for software components. This screen also lets upgrader, e.g., the database administrator, specify dependencies between software components. For example, the client software component requires that the Schema component and the Schema component are already installed before the client can start up.

The component screen has two applies: a software component applet which defines the name and required versions for a software component, and a required software component applet, which defines the list of other software components required to use the current software component. This applet is a child of the software component applet.

The Software Component applet lets the upgrader, e.g., the database administrator, enter the attributes of a software component. It can have one or more of the following fields:

Name (required). The name of the software component.

Comments (optional). The description of the software component. Minimum version (optional). The minimum version that must be installed on a machine to use this software component. If NULL, then the software component does not have a minimum version.

Maximum version (optional). The maximum version that must be installed on a machine to use the software component. If NULL, then the software component does not have a maximum version. The applet verifies that the minimum version is less than or equal to the maximum version.

Locate method (optional). The method to use to get the install location of the software component. This is a picklist.

Location Info (optional). Additional information for the locate method.

Version method (optional). Method to get the currently installed version of software component. This is a picklist.

Version Info (optional). Additional information for the version method.

The Software Component applet, lets the upgrader, e.g., the database administrator, define required software components for a software component. This applet has the following fields:

Required software component (required). The name of the required software component.

Comments (optional).

Start up flag (required). Specifies whether the required software component is required to start up the software component. Some required software component are used by a software component but not required for start up. For example, the client requires Microsoft Word if the user uses Correspondence but Microsoft Word is not required when starting up the client. Upgrade Kit Item Arguments screen. It is possible to use this screen to define the list of valid arguments for each upgrade kit item type. This screen has one applet:

Upgrade Kit Item Type Arguments applet. This applet lets the upgrader, e.g., the database administrator, enter the valid arguments for an upgrade kit item type. This applet has the following fields:

Item type (required). The type of upgrade kit item to apply. Error! Reference source not found, shows the valid types of upgrade kit items and their respective arguments. This is a picklist.

Sequence (required). An integer denoting the sequence that upgrade wizard passes the argument to apply the upgrade kit item.

Required Flag (required). Specifies whether the argument is required.

Comments (optional). The description of the upgrade kit item type argument.

Default value (optional). Default value of the argument.

Upgrade Kit Applet

This applet lets the upgrader, e.g., the database administrator, enter the attributes of an upgrade kit. This applet has the following fields:

Name (required). The name of the upgrade kit.

Title (required). The user-friendly name of the upgrade kit. The upgrade wizard displays this string on the title bar of the upgrade wizard dialog box. This value defaults to the name of the upgrade kit.

Comments (optional). The description of the upgrade kit. The upgrade wizard displays this description when the upgrade wizard starts up.

Status (required). The current status of the upgrade kit. The status is set 'Pending' when defining the upgrade kit. After the upgrader, e.g., the database administrator, presses the "Release" button, then the status changes to 'Active'. The status changes to 'Inactive' if the upgrader, e.g., the database administrator changes the status chooses the delete record action on the upgrade kit.

Upgrade kit archive file (optional). The attributes for the attached upgrade kit archive file. These are the attributes used by the file attachment business component and frames. Mobile users can navigate to this applet and request that Remote download the upgrade kit archive in the next synchronization session.

After the upgrader, e.g., the database administrator, "releases" the upgrade kit, any mobile or connected user can download and apply the upgrade kit to the local machine. The user navigates this applet and double clicks on an upgrade kit. If the upgrade kit archive file is not accessible on the local machine (i.e. mobile user), then the applet asks the user whether they want to submit a request to download the upgrade kit archive file in the next synchronization session. If the upgrade kit is already accessible on the local machine, then the applet invokes the upgrade wizard to apply the upgrade kit to the local machine. The upgrade wizard waits for the client to exit before starting the upgrade.

Upgrade Kit Items applet. This applet lets the upgrader, e.g., the database administrator, enter the items for the upgrade kit. This applet has the following fields:

Sequence (required). An integer denoting the sequence in which to execute the upgrade kit items.

Title (required). The user-friendly title of the upgrade kit item. The upgrade wizard displays this string on the list of items to perform in the upgrade.

Comments (optional). The description of the upgrade kit item. The upgrade wizard displays this description when the user highlights the upgrade kit item.

Disk Space Estimate (optional). The amount of disk space required to apply upgrade kit item to a machine. The upgrader, e.g., the database administrator, provides this estimate. If the estimate is NULL, then the upgrade wizard makes a disk space estimate based on some predefined rules.

Item type (required). The type of upgrade kit item to apply. Error! Reference source not found, shows the valid types of upgrade kit items and their respective arguments.

The Upgrade Kit Item Arguments applet lets the upgrader, e.g., the database administrator, enter arguments for an upgrade kit item. The list of valid arguments for each upgrade kit item type is stored in the S_UPG_ITARG table. This applet creates intersection records between upgrade kit items and upgrade kit type arguments. This applet has the following fields:

Name (required). The name of the argument.

Comments (optional). The description of the upgrade kit item. The upgrade wizard displays this description when the user highlights the upgrade kit item.

Argument value (required).

File attributes (optional). The attributes for files attached to the upgrade kit argument. The upgrader, e.g., the database administrator, attaches files to the upgrade kit item.

The Upgrade Kit Components applet lets the upgrader, e.g., the database administrator, define which software components are required for this upgrade. For example, you can not install version 3.1.2 on a machine unless you have version 3.1.0 or higher already, installed on that particular local machine. This applet also lets the upgrader, e.g., database administrators specify the sol, rare components that the upgrade kit affects.

The applet has the following fields:

Software Components (required). The software component that is affected by this upgrade kit.

Minimum Installed Version (optional). This field stores the minimum version of the software component required to install this upgrade kit. This field can be left NULL if the upgrade kit does not require this software component.

Maximum Installed Version (optional). This field stores the maximum version of the software component required to install this upgrade kit. This field can be left NULL if the upgrade kit does not require this software component.

New Installed Version (optional). This field stores the new version of the software component if this upgrade kit is applied to a machine. This field can be left NULL if the upgrade kit does not install a new version of the software component.

The dialog in this applet verifies that the minimum version is less than or equal to the maximum version. It also verifies that the new version is greater or equal to the maximum version.

The Upgrade Kit Wizard includes a set of pre-defined dialogs to assist the upgrader, e.g., the database administrator, in creating upgrade kits that customers need most often. It may contain one or more of the following elements:

Screen 1: Choose Upgrade Kit Type

Database extension. Create an upgrade kit to apply the database extensions. The upgrade kit consists of two upgrade kit items: a DDL file to apply database schema changes and a DAT file to distribute the Repository data file to remote databases. The Repository data file contains a subset of repository tables needed to initialize the dictionary common api.

CDF files. Create an upgrade kit to distribute the new CDF files to all users.

Report files. Create an upgrade kit to distribute the new Report files to all users. Help files. Create an upgrade kit to distribute the new Help files to all users.

Sample Database. Create an upgrade kit to distribute the new Sample Database to all users.

Third Party Software. Create an upgrade kit to distribute the third party software to all users.

Screen 2: Full or Patch Install

Full install

Patch install

Screen 3: Version Information

Enter minimum required version: For full installs, defaults to NULL. Otherwise, defaults to ?

Enter maximum required version: For full installs, defaults to NULL. Otherwise, defaults.

Enter new version: defaults to software component's current maximum version+1

The dialog verifies that the minimum version is less than or equal to the maximum version. It also verifies that the new version is greater or equal to the maximum version.

Screen 4: Files

Enter the source files: For full installs, select a directory that contains the files for the upgrade kit. The Upgrade Kit Wizard adds all the files in the directory and sub-directories to the upgrade kit.

For patch installs, select one or more files to add to the upgrade kit.

Enter the destination directory for the files.

Screen 5: Confirm

Review the information for the new upgrade kit and press OK to create the new upgrade kit. Otherwise, press Cancel to abort.

A major component of the system, method, apparatus, and program product of our invention is the upgrade wizard. The primary function of the upgrade wizard is to apply upgrade kits. In a preferred exemplification of our invention the upgrade wizard has very simple user interface. When the upgrade wizard first starts up, it displays the title and description of the upgrade kit to the user. After the user presses the OK or other similar button, the upgrade wizard then displays a list of upgrade kit items to the user. The upgrade wizard displays the title of the upgrade kit item. When the user highlights a specific upgrade kit item, the upgrade wizard also displays the description of the chosen item in the bottom frame.

After the user reviews the upgrade kit items and presses the START or other similar button, the upgrade wizard performs each of the upgrade kit items in order. A bar indicator may show an estimate of the progress of the upgrade. The upgrade wizard may also highlight the upgrade kit item after the item is completed.

Algorithms and Procedures

Version Checking Function. To check a software component's version, the upgrade wizard gets the required versions from the database and the actual versions from the software component itself. To determine which components need checking, the upgrade wizard starts from the base component and walks through the required component network to get a list of the required components.

The upgrade wizard programs call a function to do the version checking. The caller passes the "compiled" component information. The function returns a list of software components that are out-of-date and the current and required versions for each out-of-date software component.

The function must check the version for each software component listed in the "compiled" component information. First, the function must locate the component. this regard, "Error! Reference source not found" shows a list of methods for locating software components. Once located, the function can check the version of the component and the function can determine if the component can be upgraded. The CDF file stores a version number in the CDF file. The Upgrade Kit Wizard writes the value to the CDF file.

The CFG files: add a new version attribute in [ ] section. The Upgrade Kit Wizard writes the value to the CFG file.

Determining Which Upgrade to Run. The upgrade kit component table stores component and version information for an upgrade kit. This table describes which components an upgrade kit installs and which components are required by the upgrade. Detecting which upgrade kits to apply may be non-trivial.

The method, apparatus, system, and program product of our invention uses a recursive algorithm to search for the necessary upgrade kits. The algorithm is as follows:

```
If current_versions=desired_versions
    Call callback with current upgrade list
    Return TRUE;
If upgrade list is full
```

```
            Return TRUE;
        For each upgrade
        Do
            If upgrade already in upgrade list
                Continue;
                    If upgrade can't be run now (i.e.
                    upgrade_required_versions != current-versions)
                Continue;
                Add upgrade to the list
                Apply upgrade information to current_versions
                Recurse
                Remove upgrade from the list
                Remove upgrade information from current_versions
            Done
            Return TRUE;
```

This algorithm produces a list of upgrade kit to get from the current installed version to the required version. If there is more than one path, the function selects the path with the fewest upgrade kits.

Upgrade wizard. The upgrade wizard is a simple, standalone program whose sole function is to apply upgrade kits to a local machine. The upgrade wizard does not connect to or require the Database to run. The upgrade wizard reads all parameters and stores state information in simple files. The upgrade wizard need not be capable of merging transactions. The upgrade wizard can perform the implementation portion of Dbinit (though not the transfer portion).

Running the upgrade wizard. The upgrade wizard reads two types of files: a state file and an upgrade driver file. Both file types are human readable so support can "fix" the files if needed.

State file. The state file contains a list of upgrades that need to be run and the state of the upgrade. The state file is empty if there are no upgrades pending or in-progress. The client and Server programs check the state file during start-up. If the state file is not empty, they invoke the upgrade wizard to resume the upgrade.

Driver file. The upgrade driver contains a list of upgrade kit items that need to be performed for the upgrade. Error! Reference source not found, shows a list of valid upgrade kit items.

At start up, the upgrade wizard reads the driver file and verifies that there is sufficient disk space to apply the upgrade. The upgrade wizard uses the disk space estimate supplied for each upgrade kit item. If the upgrader, e.g., the database administrator, not provide an estimate, the upgrade wizard estimates the disk space using some Dun algorithm. The upgrade wizard notifies the user if there is insufficient disk space on local machine to apply the upgrade kits.

The upgrade wizard then reads the state file. If the state file is not empty, the upgrade wizard first rolls back all changes by running the completed upgrade kit items in reverse order.

The upgrade wizard estimates the time to apply the upgrade kits to the local machine and waits for the user to start the upgrade. The upgrade wizard updates the status file as it processes actions. It flushes the changes to disk (using fflush, and _commit). The upgrade wizard saves data to a backup directory before performing each action.

Xxx shows the backup steps it takes for each upgrade kit items type. For example, prior to executing any database related actions, the upgrade wizard backs up the local database. We don't actually believe this will improve recoverability, but it can't hurt (well, it can actually). When the upgrade completes successfully, the upgrade wizard deletes all backup files. It also deletes the upgrade status file is deleted.

Upgrading the upgrade wizard. The upgrade wizard has no dependencies on any other program. It does not load CFG files or DLLs. To support upgrading the upgrade wizard itself, programs that invoke the upgrade wizard follows these steps:

Check if a "ready" version of the upgrade wizard executable exists.

If a "ready" version exists, delete the existing upgrade wizard executable and rename the "ready" version to current upgrade wizard executable.

If a upgrade wizard executable does not exist, rename the source upgrade wizard to the upgrade wizard executable.

The upgrade wizard renames the source upgrade wizard to the ready upgrade wizard when it finishes an upgrade. Preferably this happens when the upgrade status file is empty which will let the user change the format of the status file. Alternatively, this can be done immediately after an upgrade which has produced an upgraded upgrade wizard executable so that the next upgrade can take advantage of new upgrade wizard features and presumably new upgrade wizard driver file syntax.

This algorithm ensures that the same upgrade wizard is to be used throughout the upgrade, even if it is restarted after installing a new version of the upgrade wizard.

Invoking the Version Checking Function. Each program calls the version checking function at pre-defined times.

Client

At startup, perform a version check for client. The client reads the required versions from the S_UPG_COMP table's "compiled" LONG column and passes the information to the version checking function.

Server

At startup, the Server starts a new server component—Server Version Checker—to perform the version check. The Server Version Checker reads the required versions for the Server component from the S_UPG_COMP table's compiled" LONG column and passes the information to the version checking function.

Docking Client and Replication Agent

At the start of each synchronization session, the docking client (or replication agent) gets the schema version of the server database via a DRL message. The docking server reads the server database S_APP_VER table and sends the server database schema version to the docking client. If the major schema version on the server database and local database are different or a dbinit is pending, then the docking client invokes Dbinit to reinitialize the database.

Data Merge watches for transactions that update the "compiled" LONG column in S_UPG_COMP. For the docking client, Data Merge watches for changes to the "Client" component. For the Replication Agent, Data Merge watches for changes to the "Server" component.

As soon as Data Merge applies a transaction on this column for the "watched" component, Data Merge commits and stops merging transactions. The docking client then performs a version check. The Replication Agent starts the Server Version Checker to perform the version checks. If one or more required versions do not match, then the docking client (or Server Version Checker) finds one or more upgrade kits to apply, downloads the upgrade kit archive files (if not already accessible on the local disk) and invokes the upgrade wizard to apply the upgrade.

Dictionary Cache File. The dictionary cache file (i.e. the subset of the Repository needed by server programs and the docking client) provides a "cache" file which programmed to load the dictionary into memory. Using a "cache" file eliminates the need to load the dictionary data into all remote databases reduces the size of the rem( databases and also reduces the time to initialize or upgrade remote databases. It is possible, and is within the scope of our invention, to use the existing diccache.dat mechanism for the "cache" file. The diccache.dat file contains a file representation G dictionary. In operation, a version number is stored in the diccache.dat file to identify its version and add new methods for reading the version number from the diccache.dat file is typically in the <_ROOT>\bin directory.

While our invention has been described with respect to certain preferred embodiments and exemplifications, it is not intended to limit the scope of the invention thereby.

We claim:

1. A method for a server computer to distribute and install software upgrades on client computers, comprising:

under control of the server computer,
defining contents of software version upgrade kits of software installed on client computers, the software version upgrade kits each being self-contained and comprising files, actions, and an upgrade wizard to upgrade a software component from one version to another version;
writing the contents of the software version upgrade kits to a database on the server computer as a table of contents, the table of contents showing for each of the upgrade kits the contents of that upgrade kit and any software components required for an upgrade using that upgrade kit; and
for each of multiple client computers,
comparing the table of contents of the software version upgrade kits to software installed on that client computer to determine one or more software version upgrade kits that will each effect an upgrade on that client computer from a version of a software component currently installed on that client computer to an updated software component version; and
building copies of the determined software upgrade kits for that client computer from the table of contents; and
for each of the multiple client computers,
determining whether software components for a program that is currently running on that client computer are up-to-date; and
when one or more software components of the program are not up-to-date,
interrogating other installed software components on that client computer to determine the versions of those not-up-to-date software components that are installed on that client computer;
notifying the server computer of the determined installed versions of the not-up-to-date software components on that client computer;
downloading copies of software upgrade kits built on the server computer for that client computer to upgrade the not-up-to-date software components;
for each of the downloaded software upgrade kits, invoking the upgrade wizard for that software upgrade kit on that client computer to upgrade one of the not-up-to-date software components on that client computer, the upgrade wizard performing the software component upgrade by performing the actions of the upgrade kit and using the files of the upgrade kit, the upgrade wizard keeping track of the upgrade's progress and, if an error is detected during the upgrade, automatically rolling back the changes and restoring the client computer to a pre-upgrade state; and
after the upgrading of the not-up-to-date software components, restarting execution of the program so as to use the upgraded software components.

2. The method of claim 1 including:
before the performing of an upgrade of a software component, creating a backup of local files;
tracking progress of the performing of the upgrade;
rolling back changes made during the performing after an error occurs;
instantiating the local file backup; and
restarting the upgrade from a save point.

3. The method of claim 1 comprising monitoring progress of the performing of an upgrade of a software component on a client from a server.

4. The method of claim 1 including downloading one or more upgrade kits for software components to a client computer before the upgrade of the software component is required on the client computer.

5. The method of claim 1 wherein the currently running program on the multiple client computers is database management software, and wherein the upgraded software components include database schemas.

6. A client-server computing system comprising a server computer and at least one client computer that periodically docks with the server computer, the server computer including a database management system and a database, the database being partially replicated from the server computer to the client computer during docking, the client-server system being configured to perform a method to apply upgrades from the server computer to software components resident on the client computer, the method comprising:

defining contents of version upgrade kits that each include files and actions and an indication of an upgrade wizard to upgrade one or more software components from one version to another version, the software components to be upgraded by at least some of the upgrade kits including database schema for the partially replicated database on the client computer;
writing the contents of the version upgrade kits to a database as a table of contents, the table of contents showing the contents of each upgrade kit and software components required by an upgrade using an upgrade kit;
determining one or more software components for a currently running database management software program on the client computer that are not up-to-date, the database management software program interacting with the partially replicated database on the client computer, those one or more software components including at least one of the database schema for the partially replicated database on the client computer;
retrieving identifications from the table of contents of one or more version upgrade kits to download from the server computer to the client computer to effect upgrades of the determined software components from installed versions to required versions, the identified upgrade kits including one or more of the at least some upgrade kits that upgrade the database schema for the partially replicated database on the client computer;

building copies of the identified upgrade kits and of additional upgrade kits based on the table of contents, the additional upgrade kits for performing upgrades of software components on the client computer that are not needed for the database management software program;

during docking of the client computer with the server computer, downloading copies of the built upgrade kits from the server computer to the client computer, each of the built upgrade kits being self-contained;

invoking the upgrade wizard to perform upgrades on the client computer of at least the determined software components based on the downloaded upgrade kits, the upgrading of each software component including identifying a state of the upgrade for that component and performing at least some of the actions of the one or more upgrade kits for that software component based on the identified state, the upgrade wizard keeping track of the upgrade's progress and, if an error is detected during the upgrade, automatically rolling back the changes and restoring the client computer to a pre-upgrade state;

after performing the software component upgrades, restarting the database management software program; and subsequent to the docking of the client computer with the server computer, determining that the client computer needs one or more of the software component upgrades corresponding to the additional upgrade kits and performing those one or more upgrades based on the previously downloaded additional upgrade kits.

7. The client-server computing system of claim 6 further configured to create on the client computer a backup of local files before applying the upgrades from the downloaded software upgrade kits, to track progress of an upgrade, and to, when an error occurs during the upgrade, roll back changes, instantiate the local files backup, and restart the upgrade from a save point.

8. The client-server computing system of claim 6 further configured to monitor progress of a software upgrade on the client computer from the server computer.

* * * * *